United States Patent
Fruehan

(10) Patent No.: US 7,556,667 B2
(45) Date of Patent: Jul. 7, 2009

(54) LOW CARBON ALUMINUM PRODUCTION METHOD USING SINGLE FURNACE CARBOTHERMIC REDUCTION OPERATED IN BATCH MODE

(75) Inventor: Richard J. Fruehan, Murrysville, PA (US)

(73) Assignee: ALCOA Inc., Pittsburgh, PA (US)

( * ) Notice: Subject to any disclaimer, the term of this patent is extended or adjusted under 35 U.S.C. 154(b) by 116 days.

(21) Appl. No.: 11/676,017

(22) Filed: Feb. 16, 2007

(65) Prior Publication Data

US 2008/0196545 A1    Aug. 21, 2008

(51) Int. Cl.
   C22B 21/02    (2006.01)
(52) U.S. Cl. ..................................... 75/10.27
(58) Field of Classification Search ................. 75/10.27
   See application file for complete search history.

(56) References Cited

U.S. PATENT DOCUMENTS

| | | | | |
|---|---|---|---|---|
| 2,974,032 | A | 3/1961 | Grunert et al. | 75/10.27 |
| 4,033,757 | A | 7/1977 | Kibby | 75/10.27 |
| 4,099,959 | A | 7/1978 | Dewing et al. | 75/10.27 |
| 4,334,917 | A | 6/1982 | Kibby | 75/10.27 |
| 4,388,107 | A | 6/1983 | Kibby | 75/10.27 |
| 4,409,021 | A | 10/1983 | Moore | 75/10.27 |
| 4,533,386 | A | 8/1985 | Kibby | 75/10.27 |
| 6,440,193 | B1 | 8/2002 | Johansen et al. | 75/10.27 |
| 6,530,970 | B2 | 3/2003 | Lindstad | 75/10.27 |
| 6,805,723 | B2 | 10/2004 | Aune et al. | 75/10.27 |
| 6,980,580 | B2 | 12/2005 | Aune et al. | 373/61 |
| 2006/0042413 | A1 | 3/2006 | Fruehan | 75/10.27 |

FOREIGN PATENT DOCUMENTS

WO    2006/026771    3/2006

OTHER PUBLICATIONS

Proceedings 6th Conference on Molten Slags, Fluxes and Salts, Edited by S. Seetharaman and D. Sichen "Carbothermic Aluminum", K. Johansen, J. Aune, M. Bruno and A. Schei, Stockholm, Sweden-Helsinki Finland, Jun. 12-17, 2000.
International Search Report and Written Opinion of the International Searching Authority for PCT Application No. PCT/US2005/31521.
International Search Report and Written Opinion from corresponding International Application No. PCT/US2008/050279.

*Primary Examiner*—Roy King
*Assistant Examiner*—Yoshitoshi Takeuchi
(74) *Attorney, Agent, or Firm*—Greenberg Traurig, LLP

(57) ABSTRACT

A batch process for producing low carbon aluminum using a single carbothermic reactor furnace is disclosed in which the slag making, metal making and carbon extraction is carried out in a single furnace, single compartment reactor. The $Al_2O$ and Al vapors generated in slag making and metal making steps are recovered in a vapor recovery reactor, and treated with a carbonaceous material to produce recyclable material comprising $Al_4C_3$. The recyclable material is used to assist with one or more subsequent slag making steps.

9 Claims, 2 Drawing Sheets

LOW CARBON ALUMINUM PRODUCTION METHOD USING SINGLE FURNACE CARBOTHERMIC REDUCTION OPERATED IN BATCH MODE

FIELD OF THE INVENTION

The present invention relates to a method of producing low carbon aluminum in a single reactor compartment, carbothermic furnace operated in a batch mode.

BACKGROUND OF THE INVENTION

The U.S. aluminum industry is one of the largest in the world with about 2.5 million metric tons of primary aluminum produced in 2005. Presently, the aluminum industry relies on three major processes for primary aluminum production: alumina refining from bauxite, anode production, and aluminum smelting by electrolysis in the Hall-Heroult process. The Hall-Heroult electrolytic cells electrochemically reduce alumina to aluminum metal via carbon anodes and molten aluminum cathodes in the smelting process. Smelting is the most energy intensive step in primary aluminum production which accounts for between 2% and 3% of the electricity used in the U.S. every year (about 15 kWh/kg aluminum produced). Smelting also results in a variety of emissions, effluents, by-products and solid wastes. Greenhouse gases are a major pollutant from aluminum production and are caused by fossil fuel consumption, carbon anode consumption, and perfluorocarbons from anode effects. Emissions from anode production include particulates, fluorides, polycyclic aromatic hydrocarbons (PAH) and sulfur dioxide ($SO_2$). Emissions from aluminum smelting include carbon monoxide (CO), carbon dioxide ($CO_2$), $SO_2$, fluorides, perfluorocarbons (PFCs, e.g., $CF_4$, $C_2F_6$), and PAH. It would be advantageous to lower costs and reduce waste to remain competitive with foreign producers. The smelting step is a priority area for improvement because of high energy use and undesirable emissions and by-products implicated in climate change.

Carbothermic reduction of aluminum is an alternative process for aluminum production using a chemical reduction reaction in a reactor. Carbothermic processes require much less physical space than the Hall-Heroult electrolytic reduction process. The carbothermic reduction process of aluminum production, as a replacement for the Hall-Heroult process, would result in decreased electrical consumption. Long term estimates suggest the carbothermic process could reduce energy requirement by over 30% to about 8.5 kWh/kg. The carbothermic aluminum production process would also eliminate perfluorocarbon emissions resulting from carbon anode effects, hazardous spent potliners, and hydrocarbon emissions associated with baking of consumable carbon anodes. This alternative carbothermic aluminum production process would be more energy efficient and have less environmental impact than traditional aluminum production plants.

The direct carbothermic reduction of alumina has been described in U.S. Pat. No. 2,974,032 (Grunert et al.) and U.S. Pat. No. 6,440,193 B1 (Johansen et al.) as well as in *Proceedings 6th Conference on Molten Slags, Fluxes and Salts,* Edited by S. Seetharaman and D. Sichen "Carbothermic Aluminum", K. Johansen, J. Aune, M. Bruno and A. Schei, Stockholm, Sweden-Helsinki Finland, Jun. 12-17, 2002.

It has long been recognized that the overall aluminum carbothermic reduction reaction:

$$Al_2O_3 + 3C \rightarrow 2Al + 3CO \quad (1)$$

takes place, or can be made to take place, generally in steps such as:

$$2Al_2O_3 + 9C \rightarrow Al_4C_3 + 6CO \text{ (vapor)} \quad (2)$$

$$Al_4C_3 + Al_2O_3 \rightarrow 6Al + 3CO \text{ (vapor)} \quad (3)$$

$$Al_2O_3 + 2C \rightarrow Al_2O \text{ (vapor)} + 2CO \text{ (vapor)} \quad (4)$$

$$Al_2O_3 + 4Al \rightarrow 3Al_2O \text{ (vapor)} \quad (5), \text{ and}$$

$$Al \rightarrow Al \text{ (vapor)} \quad (6).$$

Reaction (2), the slag producing step, generally takes place at temperatures between 1900° C. and 2000° C. Reaction (3), the aluminum producing step, generally takes place at temperatures above about 2050° C. and requires substantial heat input. A large quantity of aluminum vapor species are formed during reactions (2) and (3). In addition to the species shown in reactions (2) and (3), volatile species including gaseous Al, reaction (6), and gaseous aluminum suboxide ($Al_2O$) are formed in reaction (4) or (5). In the overall carbothermic reduction process, the $Al_2O$ and Al gases can be recovered by reacting them with carbon in a separate reactor usually called the vapor recovery unit or vapor recovery reactor (VRR).

Other patents relating to carbothermic reduction to produce aluminum include U.S. Pat. No. 4,099,959 (Dewing et al.), U.S. Pat. Nos. 4,033,757 and 4,388,107 (both Kibby). U.S. Pat. Nos. 4,334,917 and 4,533,386 (both Kibby), U.S. Pat. No. 6,440,193 (Johansen and Aune), and U.S. Patent Publication No. US2006/0042413 (Fruehan).

One prior method of continuous carbothermic aluminum production method teaches reaction of C and $Al_2O_3$ in a first stage compartment to produce a slag containing $Al_2O_3$+$Al_4C_3$, which underflows a baffle into a second stage compartment where the $Al_4C_3$ is reduced to Al through increased temperature. A disadvantage to this process is that the aluminum metal produced contains a high concentration of C, up to saturation with aluminum carbide (~8% C) and does not readily flow out the reactor. Another disadvantage of prior staged continuous carbothermic process is that the method requires movement of the product out of the reactor to an external decarbonization unit. Another disadvantage is that extensive back-mixing may occur between the slag making and metal making portions of the reactor. Furthermore, there is a deficiency of aluminum carbide during metal making.

FIG. 1 is a simplified illustration of another prior art carbothermic reaction process that produces Al, recovers Al, $Al_2O$ and CO in the off-gases as $Al_4C_3$, $Al_2O_3$ and slag, and passes this material to the smelting furnace. In FIG. 1, gas flows are shown as dashed lines and flows of solids and molten substances are shown as solid lines. In FIG. 1, the off-gases 3, 4 from carbothermic smelting furnace are recovered during a first stage 1 and second stage 2 and forwarded to an enclosed off-gas reactor 5. The Al-components of the off-gas entering the reactor 5 react with carbon 7 to form one or more of $Al_4C_3$, $Al_2O_3$ and $Al_4C_3$—$Al_2O_3$ slag $Al_4C_3$ is fed to the furnace during the second stage 2, the metal making step.

One disadvantage of this method is that, although $Al_4C_3$ is needed in stage 2 (the metal making step) to partially satisfy the chemistry of the process, the inflow of $Al_4C_3$ from the vapor recovery reactor may also add other products to the reactor during the metal making step (e.g., unreacted carbon, slag and $Al_2O_3$). The addition of these other solid vapor recovery reactor materials during the metal making step is undesirable for several reasons, including that the addition of unreacted carbon will increase the amount of generated carbon monoxide (CO), causing excess aluminum suboxide and aluminum vaporization. There is also a limited tolerance for efficient recycling of variable vapor recovery solid discharge.

SUMMARY OF THE INVENTION

In view of the foregoing, a broad objective of the present invention is to facilitate a more efficient carbothermic aluminum production process.

A related objective is to avoid or minimize multiple reactors.

A further related objective is to minimize movement of process material between reactors.

Yet a further related objective is to increase tolerance to variation in vapor recovery reactor recyclable material.

A further related objective is to restrict excessive carbon monoxide (CO) generation and corresponding aluminum suboxide and aluminum vaporization.

A related objective is to avoid a carbide deficit in the metal making step.

Yet a further related objective is to provide for in situ decarburization of the Al—C alloy.

In addressing one or more of these objectives, the present inventor has recognized that a single-compartment, carbothermic reactor may be utilized, wherein off-gases collected during operation of the reactor are collected in an external vapor recovery reactor and the external vapor recovery reactor reacts those gases with one or more carbonaceous materials to produce a recyclable material. At least a portion of the recyclable material is recycled (e.g., sent to) to the single-compartment reactor during slag making operations to at least partially assist in the production of an aluminum carbide-containing slag. The recyclable material is not provided to the single-compartment reactor during metal making operations. The inventor has recognized that recycling of the recyclable material to the single-compartment reactor during the slag making operations, rather than the metal making operations, increases tolerance to variation in the vapor recovery reactor recyclable material, restricts excessive carbon monoxide (CO), aluminum suboxide and aluminum generation during metal making operations, and avoids a carbide deficit during metal making operations. The inventor has also recognized that addition of $Al_2O_3$ after metal making operations can provide for in situ decarburization by dissolving carbon into slag to reduce the carbon content in the Al—C alloy; aluminum that is at least partially decarburized in situ flows better during the metal tapping step.

In one aspect, methods of producing low carbon alumina are provided. One method includes the steps of producing a first mixture in a single furnace reactor having a single reactor compartment; forming an upper Al—C alloy phase and lower slag phase from the first mixture; extracting carbon from the upper Al—C alloy phase into the lower slag phase; removing at least a portion of the upper Al—C alloy phase from the reactor; collecting off-gas from the single furnace reactor and an external vapor recovery reactor; adding a carbonaceous material to the external vapor recovery reactor thereby forming a recyclable material; and feeding the recyclable material from the vapor recovery reactor to the single furnace reactor during the producing step to at least assist in the production of the first mixture. The step of forming an upper Al—C alloy and the step of extracting carbon from the Al—C alloy also occur in the single reactor compartment. In one approach, the first mixture comprises a slag and aluminum carbide, the slag generally including $Al_2O_3$—$Al_4C_3$.

In one approach, the forming an upper Al—C alloy step occurs without utilizing any recyclable material in the furnace reactor. That is, none of the recyclable material is added to the single furnace reactor during metal making operations.

In one approach, the extracting carbon step comprises the step of adding alumina to the single furnace reactor. In one embodiment, after the extracting step the Al—C alloy comprises less than 5 wt % carbon, such as less than 3 wt % carbon. Thus, in situ decarbonization is facilitated.

In one approach, the collecting off-gas step generally occurs during at least one of the producing a first mixture step and the forming an upper Al—C alloy phase step. In a particular embodiment, the collecting off-gas step occurs during both these producing and forming steps. In one embodiment, the collecting step occurs during at least one of the extracting carbon from the Al—C alloy phase and the removing at least a portion of the upper Al—C phase steps. In a particular embodiment, the collecting step occurs during both of these extracting and removing steps. In one approach, the off-gas includes vapors of at least one of $Al_2O$, Al and CO. Thus, capture of various off-gases for production of recyclable material is facilitated.

The adding a carbonateous material to the external vapor recovery reactor step generally occurs concomitant to the collecting the off-gas step. Thus, production of recyclable material is facilitated. In one approach, the recyclable material includes $Al_4C_3$. In one approach, the recyclable material comprises both slag and $Al_4C_3$.

In one approach, the feeding the recyclable material to the vapor recovery reactor occurs as part of the producing step. In a particular embodiment, the feeding recyclable material step further includes a step of adding at least one of $Al_2O_3$ and C to the single furnace reactor concomitant to the producing step. Thus, use of the recyclable material and production of the first mixture is facilitated.

DETAILED DESCRIPTION

Figure 1:
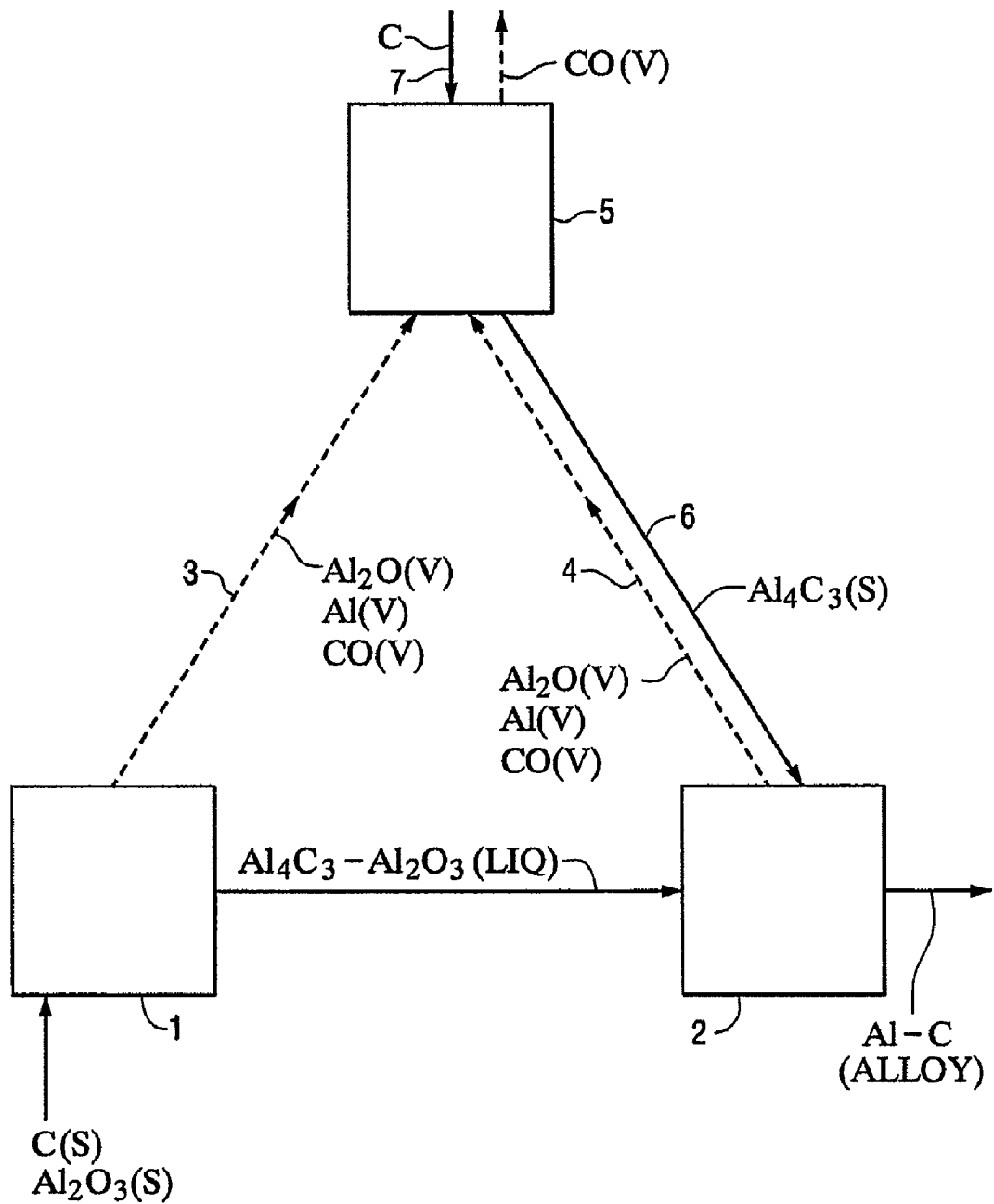
FIG. 1 is a flow sheet showing one example of a prior carbothermic reduction process for the production of aluminum.
Figure 2:
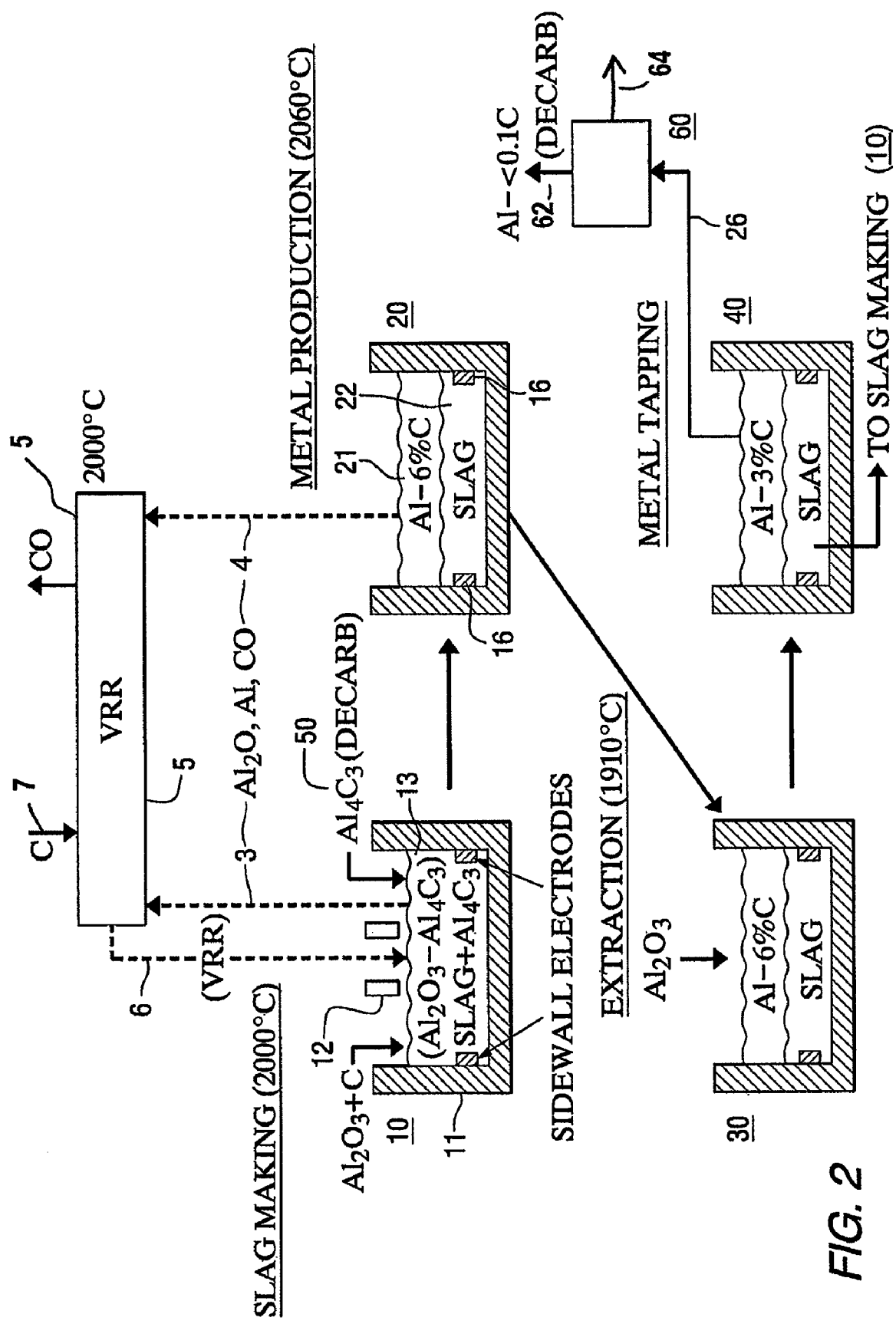
FIG. 2 is schematic view of one embodiment of a process for operating a single compartment carbothermic reactor.

Reference will now be made to the accompanying figures, which at least assist in illustrating various pertinent features of the invention. FIG. 2 illustrates one embodiment of a carbothermic method for producing aluminum in a single compartment furnace. In the illustrated embodiment, a single furnace 11, having side walls and a bottom, and a single, hollow reactor compartment 13 is used without interior underflow partition walls/baffles. The furnace 11 can have a substantially rectangular, square, circular or oval shape. Within the sidewalls of the furnace 11 are submersed resistance heating electrodes 16 located in the side(s), and or the bottom, of the reactor. The electrodes 16 can be made from carbon, graphite, or non-consumable inert ceramic materials, where each is individually supplied with electricity by electric current means (not shown). In the illustrated embodiment, the resistance heating electrodes 16 are horizontal and used in metal making to, as compared to top heating electrodes, reduce super heating the metal, reduce excessive vaporization and limit high rates of electrode consumption. The electrodes 16 may be disposed at/adjacent to the bottom phase molten slag phase/level 22, as shown in steps 20, 30 and 40, discussed in further detail below.

In the producing slag step 10, alumina ($Al_2O_3$) and carbon (C) are added to the single compartment reactor furnace 11 to produce a first mixture 13, which generally comprises slag (i.e., $Al_2O_3$—$Al_4C_3$ saturated with aluminum carbide) and excess solid $Al_4C_3$. The furnace 11 operates generally at about 1875° C. to 2000° C. during this step 10. An off-gas 3 is produced in step 10, which may contain various aluminum species including Al (vapor), aluminum suboxide ($Al_2O$, vapor) and carbon monoxide (CO), and is provided to an external vapor recovery reactor 5 where it is treated (e.g., reacted) with a carbonaceous material 7 to create at least a portion of a recyclable material 6. The carbonaceous material 7 may include one or more of charcoal, petroleum coke (raw or calcined), chemically purified coals, cokified carbohydrates and the like. The produced recyclable material 6 may contain one or more of the following species in any combination: $Al_4C_3$, $Al_2O_3$, $Al_2O_3$—$Al_4C_3$ slag and unreacted carbon. The recyclable material 6 may be used as a feedstock to assist in the slag producing step (step 10). Optionally, at least one top vertical retractable exterior electrode 12 may be used in order to melt the solid $Al_2O_3$ and C at start-up or may be used to produce the molten slag.

The metal forming step (step 20), occurs in the same compartment 13 as the slag producing step 10. The metal forming step involves forming an Al—C alloy upper phase 21 and a lower slag phase 22 by elevating the temperature of the single reactor furnace 11 to between about 2050° C. to about 2100° C. The carbon content in the Al—C from the metal forming step is about 4-8 wt % C. No additional $Al_4C_3$ is required or used for this metal forming step. An off-gas 3a may be produced during the metal forming step, and the off-gas 4 may contain various aluminum species including Al (vapor), aluminum suboxide ($Al_2O$, vapor) and carbon monoxide (CO). The off-gas 4 may be provided to the external vapor recovery reactor 5, and treated with the carbonaceous material 7 to create at least a portion of the recyclable material 6. The recyclable material 7 is not fed to the compartment 13 of the reactor during metal making (step 20).

The carbon extracting step (step 30), occurs in the same compartment 13 as the slag producing step 10 and the metal making step 20. The carbon extraction step serves to extract carbon from the upper Al—C phase 21 into the lower slag phase 22 by addition of $Al_2O_3$ to the furnace, which addition assists in producing an $Al_2O_3$ rich slag and aids in decreasing the temperature to about between about 1900° C.-1950° C. The combination of $Al_2O_3$ addition and the decrease in temperature facilitates removal of at least some of the carbon from the Al—C phase into the alumina rich $Al_2O_3$—$Al_4C_3$ slag. On average, about 20 wt %-65 wt % of the carbon in the Al—C alloy will be removed during the carbon extraction step. Hence, the Al—C alloy generally will comprise not greater than 5 wt % C, and preferably not greater than 3 wt % C after the carbon extracting step.

The metal tapping step (step 40) involves removing the Al—C alloy from the single furnace reactor 11. In the metal tapping step, the decarburized Al—C alloy from the carbon extracting step (step 30) is moved to an external reactor 60 for further decarburization to produce a low carbon Al—C alloy 62 and a decarburization dross 64. The low carbon aluminum-C alloy 62 generally comprises not greater than 0.1% carbon by weight. The remaining slag in the reactor compartment 13 from may be used as a feedstock in the slag producing step (step 10) of subsequent cycles, optionally in the same single furnace reactor.

In one or more of steps 10, 20, and 30, $Al_2O$, CO and Al exit as streams 3 and 4 to a vapor recovery reactor 5. These vapor species are collected in the vapor recovery reactor 5 and treated with the carbonaceous material 7. The vapor recovery reactor may be, for example, a vapor recovery reactor as described by Lindstad in U.S. Pat. No. 6,530,970, which is incorporated herein by reference in its entirety. The vapor recovery reactor utilizes these off-gases to produce at least a portion of the recyclable material 6, at least a portion of which is fed to the compartment 13 of the reactor 11 during the slag making step (step 10). The recyclable material 7 is not fed to the compartment 13 of the reactor during metal making (step 20).

EXAMPLES

Producing slag: To start up the process, $Al_2O_3$ and carbon are added to make a liquid slag, with about 100 k-moles of slag (77 mole % $Al_2O_3$ and 23 mole % $Al_4C_3$) and 44 moles of $Al_4C_3$ at about 1900° C.-2000° C. Some $Al_2O$ and Al vapors are generated and collected in a vapor recovery reactor. After the process is initiated, the starting point for subsequent slag producing steps is the slag remaining after metal removal in the previous cycle. Solid discharge materials from the vapor recovery reactor are also utilized during slag making.

Forming metal: The 100 k-moles of slag with the 44 k-moles of excess $Al_4C_3$ are heated to about 2050° C.-2100° C. The metal making reaction proceeds until there are 15 k-moles of $Al_2O_3$ and 5 moles of carbide remaining in the furnace. The process produces 372 moles of Al, but 62 moles will vaporize leaving 310 moles of liquid Al, which contains about 7.5 wt % C. The vaporized aluminum species are captured in the vapor recovery reactor.

Extracting carbon: 75 k moles of $Al_2O_3$ are added to the reactor making the resulting slag 90 k-moles $Al_2O_3$- and 5 k-moles $Al_4C_3$. The slag becomes rich in $Al_2O_3$ and carbon is transferred (e.g., extracted) from the metal to the slag, resulting in a top layer of low carbon aluminum. Some electric power is necessary to heat and melt the $Al_2O_3$ while some of the energy comes from the sensible heat of the slag since its temperature is higher than required for decarburization. The slag-metal system is allowed to cool to about 1900° C. The carbon content of the aluminum metal is reduced from about 6.0% to 2.5%. This is based on a carbon distribution ratio of 2 (i.e., the ratio of wt % carbon in the slag to the wt % carbon in the metal), and with 8904 kg of metal and 9900 kg of slag in the vessel.

Removing metal: The low carbon aluminum metal is tapped and the remaining slag, 90 k-moles $Al_2O_3$ and 12 k-moles $Al_4C_3$, is the starting point for the next batch of aluminum production. The tapped low carbon aluminum may then be treated to allow further decarburization.

Collecting off-gas: Throughout the process, substantial amounts of CO are produced and carry Al and $Al_2O$ gaseous species from the furnace. A carbonaceous material is added to the off-gas in the vapor recovery reactor to treat these aluminum species. The aluminum off-gas is partially converted to $Al_4C_3$ in the vapor recovery reactor. Alumina ($Al_2O_3$) may also be added to the vapor recovery reactor. The vapor recovery reactor solids discharge can also contain unreacted carbon, slag, and $Al_2O_3$. After the metal is removed from the reactor, the solids discharge from the vapor recovery reactor are added to the remaining slag in the furnace during slag production.

Having described certain embodiments, it is to be understood that the invention may be otherwise embodied within the scope of the appended claims. Whereas particular embodiments of this invention have been described above for purposes of illustration, it will be evident to those skilled in the art that numerous variations of the details of the present invention may be made without departing from the invention as defined in the appended claims.

What is claimed is:

1. A batch carbothermic method of producing low carbon aluminum, the method comprising:
    (a) producing a first mixture in a single furnace reactor having a single reactor compartment and a plurality of resistance heating electrodes, wherein the first mixture comprises slag and solid aluminum carbide;
    (b) forming in the single furnace reactor an upper Al—C alloy phase and a lower slag phase from the first mixture;
    (c) extracting carbon from the upper Al—C alloy phase into the lower slag phase via addition of aluminum oxide to the single furnace reactor;
    (d) removing at least a portion of the upper Al—C alloy phase from the single furnace reactor;
    (e) collecting, during at least one of the producing and forming steps, off-gas from the single furnace reactor in an external vapor recovery reactor, the off-gas comprising at least one vapor species of $Al_2O$, Al and CO;
    (f) adding, concomitant to the collecting step, a carbonaceous material to the external vapor recovery reactor, thereby forming a recyclable material, the recyclable material comprising $Al_4C_3$, and
wherein the producing step comprises:
    (g) feeding the recyclable material from the vapor recovery reactor to the single furnace reactor to assist in the production of the first mixture.

2. The method of claim 1, wherein the collecting step (e) occurs during both the producing step (a) and the forming step (b).

3. The method of claim 1, wherein the forming step (b) occurs without utilizing the recyclable material in the single furnace reactor.

4. The method of claim 1, wherein, after the extracting step (c), the Al—C alloy contained in the single furnace reactor comprises less than 5% carbon by weight.

5. The method of claim 1, wherein, after the extracting step (c), the Al—C alloy contained in the single furnace reactor comprises less than 3% carbon by weight.

6. The method of claim 1, wherein the feeding step (g) further comprises:
    adding concomitant to the producing step (a), at least one of $Al_2O_3$ and C to the single furnace reactor.

7. The method of claim 1, wherein the collecting step (e) occurs during at least one of the extracting and removing steps.

8. The method of claim 1, wherein the collecting step (e) occurs during both of the extracting and removing steps.

9. The method of claim 1, wherein the recyclable material comprises slag and $Al_4C_3$.

* * * * *